United States Patent [19]

Nagase

[11] Patent Number: 5,325,250
[45] Date of Patent: Jun. 28, 1994

[54] MAGNETIC HEAD

[75] Inventor: Fumio Nagase, Tokyo, Japan

[73] Assignee: TEAC Corporation, Tokyo, Japan

[21] Appl. No.: 56,653

[22] Filed: Apr. 30, 1993

Related U.S. Application Data

[63] Continuation of Ser. No. 774,572, Oct. 10, 1991, abandoned.

[30] Foreign Application Priority Data

Oct. 15, 1990 [JP] Japan .................................. 2-275611

[51] Int. Cl.[5] .............................................. G11B 5/48
[52] U.S. Cl. .................................................. 360/104
[58] Field of Search ........................................ 360/104

[56] References Cited

U.S. PATENT DOCUMENTS 4,814,920 3/1989 Yamano ..................... 360/104 X
4,951,165 8/1990 Makabe ...................... 360/104

FOREIGN PATENT DOCUMENTS

1182917 7/1989 Japan .

Primary Examiner—A. J. Heinz
Attorney, Agent, or Firm—Michael N. Meller

[57] ABSTRACT

The miniature magnetic head according to the present invention has a bulk type magnetic head core, one side surface of which is fixed on a slider and the other side of which is exposed. The magnetic head can be made smaller than the conventional magnetic head in which both sides of the magnetic head core are respectively fixed on two sliders.

9 Claims, 9 Drawing Sheets

MAGNETIC HEAD

This application is a continuation of application Ser. No. 774,572, filed Oct. 10, 1991 and now abandoned.

BACKGROUND OF THE PRESENT INVENTION

The present invention relates to miniature magnetic heads, and more particularly to a miniature magnetic head installed in a disk storage using a flexible magnetic disk.

Figure 1:
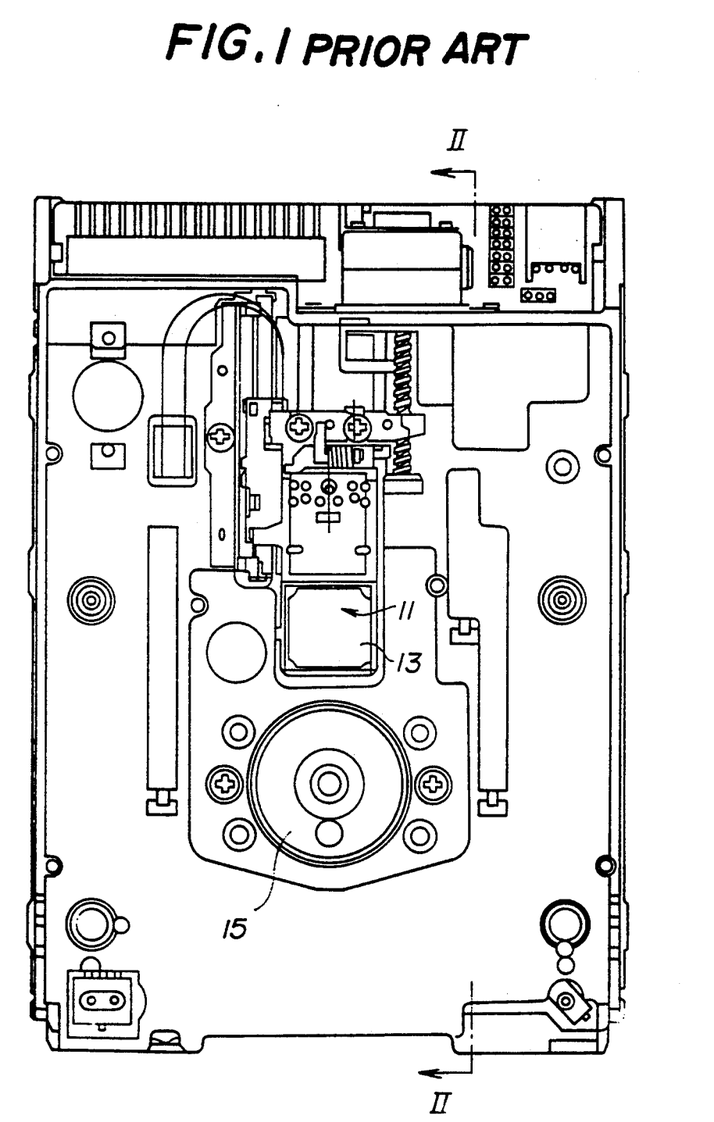
FIG. 1 shows an internal plane view of a conventional disk storage using a flexible magnetic disk.
Figure 2:
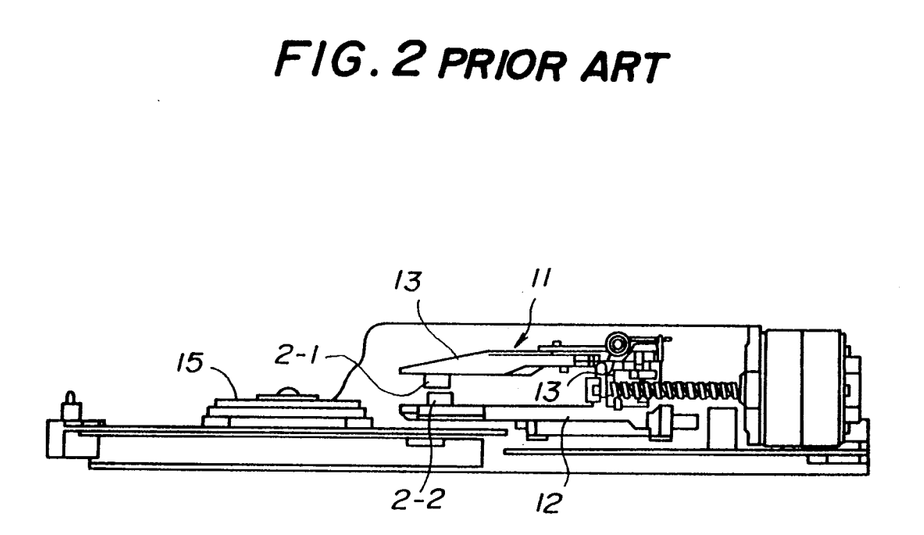
FIG. 2 shows a longitudinal section taken along a line II—II shown in FIG. 1.
Figure 3:
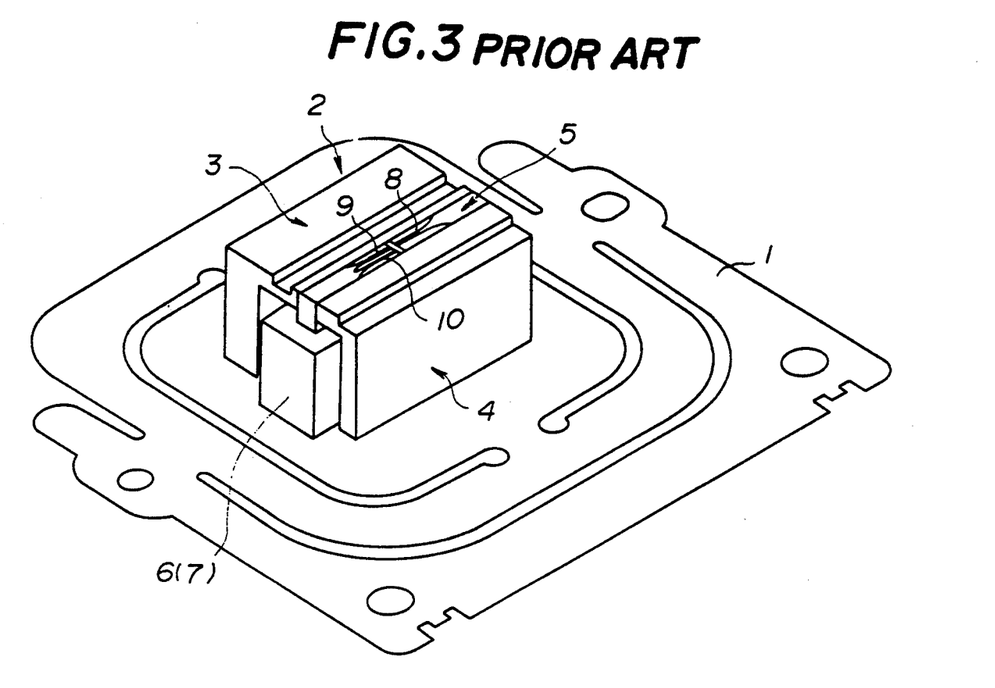
FIG. 3 shows a perspective view of conventional magnetic heads.
Figure 4:
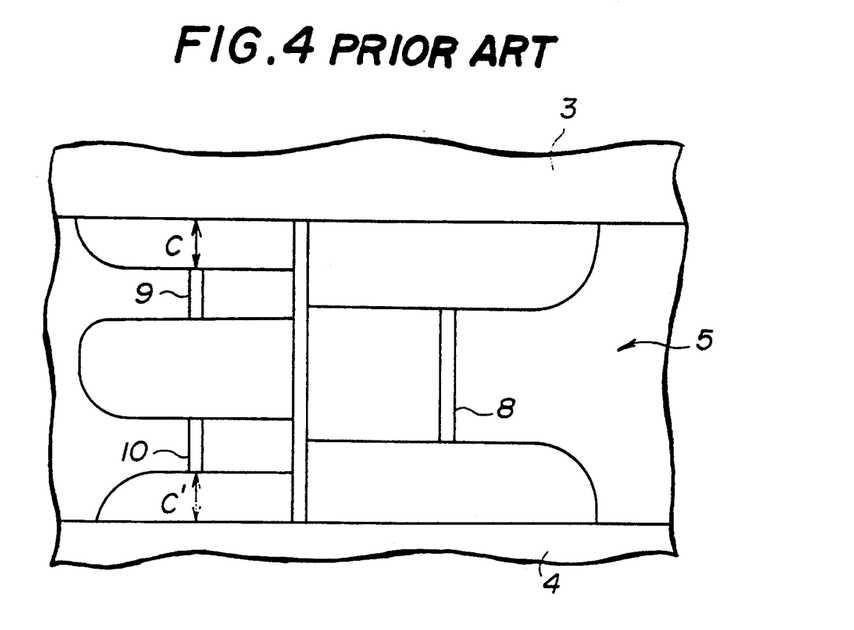
FIG. 4 shows an enlarged plane view of a head core at a contact surface of the conventional magnetic heads.

FIG. 1 shows an internal plane view of a conventional disk storage which uses a flexible magnetic disk, and FIG. 2 shows a longitudinal section taken along a line II—II shown in FIG. 1. The disk storage comprises a turn table 15, driven and rotated by a driving motor (not shown), on which a flexible magnetic disk 14 as a recording medium for recording data is to be fixed. The disk storage 15 further comprises conventional magnetic heads 2-1 and 2-2 which hold the magnetic disk 14 fixed on the turn table 15. The disk storage still further comprises a head carriage 11 comprising a head carriage body 12 and an upper arm 13 to which the magnetic head 2-1 is attached. FIG. 3 is a perspective view showing the magnetic heads 2-1 and 2-2. Since each of gimbal springs to which the respective magnetic heads 2-1 and 2-2 are attached has substantially the same construction, a magnetic head 2 generalizes both of the magnetic heads 2-1 and 2-2 and a gimbal spring 1 generalizes the above gimbal springs. The magnetic head 2 has first and second ceramic sliders 3 and 4, a tunnel-erase type of magnetic core part 5, and coils 6 and 7 (not shown) each of which is wound around the magnetic core part 5 at a predetermined position. The magnetic head core part 5 is a so-called bulk type magnetic head made by junctioning a ferrite core, and the first and second sliders 3 and 4 are provided at both sides thereof. The magnetic head core part 5 is fixed on the gimbal spring 1 by the sliders 3 and 4. FIG. 4, an enlarged view of the vicinity of a gap of the magnetic core part 5 shown in FIG. 3, shows a read/write magnetic gap 8 (abbreviated R/W gap hereinafter) and erase gaps (abbreviated E gap hereinafter) 9 and 10.

Figure 5:
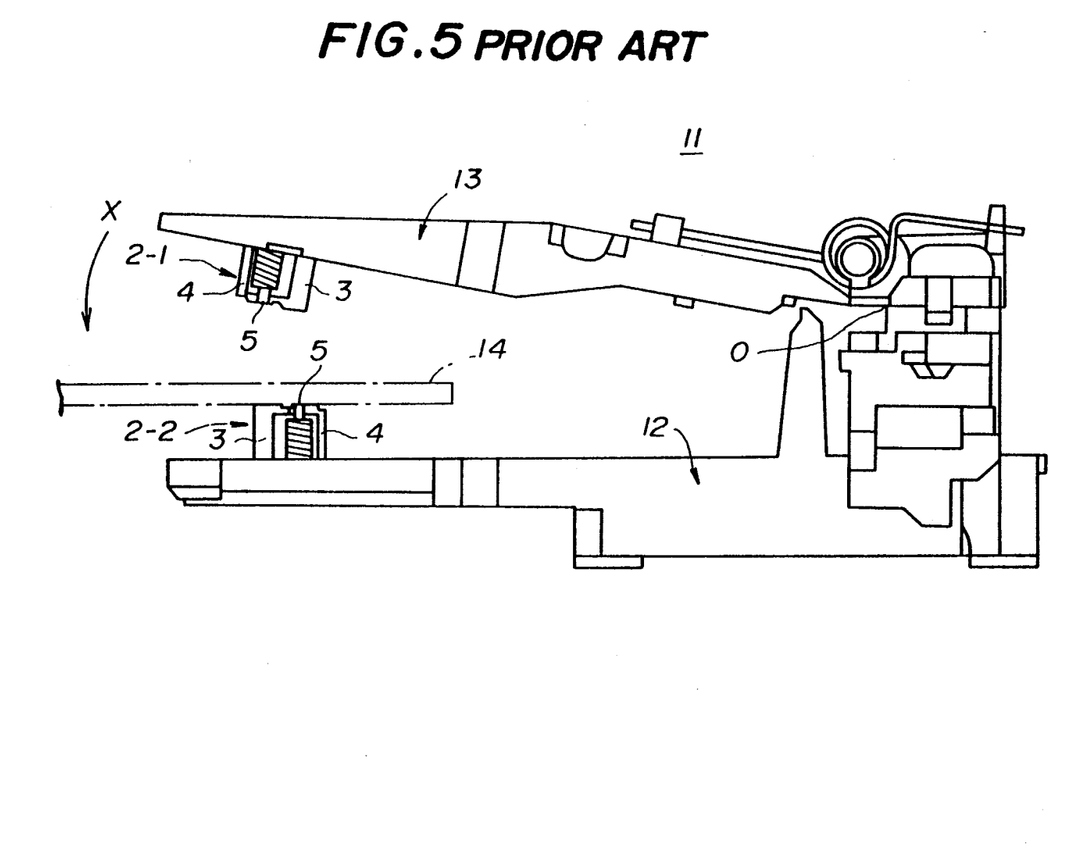
FIG. 5 shows a side view of a head carriage having the magnetic head shown in FIG. 4.

As a disk storage as thin as possible has recently been required, a magnetic head 2 as miniature and thin as possible has been increasingly required. A description will be given of the miniature magnetic head with reference to FIGS. 5 6A and 6B. The magnetic head 2 is attached, as shown in FIG. 5, to the head carriage 11. That is, the magnetic heads 2-1 and 2-2 are respectively attached to the upper arm 13 which is rotatably engaged with the head carriage 12. As is generally known, when data is written down on the magnetic disk 14 (depicted by the one-dot line in FIG. 5) and/or read out therefrom, the upper arm 13 rotates counterclockwise along an arrow X around a rotating center O to contact the magnetic disk 14. Thus, the pair of magnetic head 2-1 and 2-2 contact the magnetic disk 14 to hold it and the writing/reading is performed thereby. On the other hand, when the magnetic disk 14 is ejected from the disk storage, the upper arm 13 is upwardly moved by a mechanism (not shown) to be separated from the disk 14. Then, the magnetic disk 14 is separated from the turn table 15 and ejected from the disk storage. FIG. 5 shows the disk storage in which the upper arm 13 has been upwardly moved. A distance which the upper arm 13 can upwardly move, referred to as an upward moving amount hereinafter, influences how thick the disk storage. That is, the smaller the upward moving amount is, the thinner the disk storage can be made.

Figure 6A:
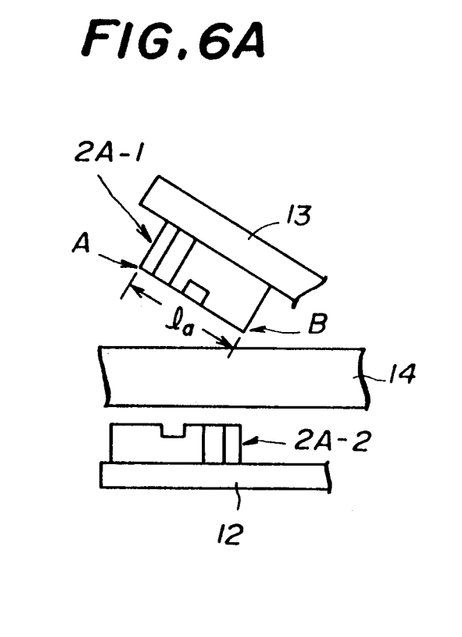
FIGS. 6A and 6B respectively show side views of the magnetic heads for explaining a relationship between a size of a magnetic head and a change in the upward moving amount of an upper arm supporting the magnetic head.
Figure 6B:
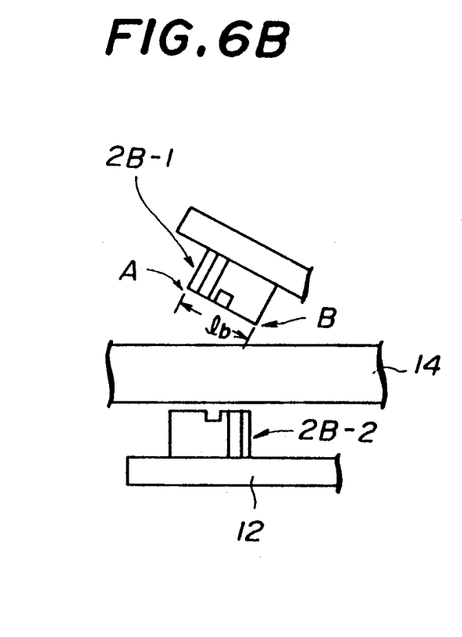

FIGS. 6A and 6B respectively show views for explaining a relationship between the size of the magnetic disk and a change in the upward moving amount of the upper arm 13. FIG. 6A depicts the larger magnetic heads 2A-1 and 2A-2, and FIG. 6B depicts the smaller magnetic heads 2B-1 and 2B-2. A description will now be given of a separating operation of the magnetic heads 2A-1 and 2B-1 when the upper arm 13 moves upwardly. First the magnetic heads 2A-1 and 2B-1 are separated from the magnetic disk 14 at an outer position shown by an arrow A and finally at an inner position shown by an arrow B. In this case, the upward moving amount of the upper arm 13 while the magnetic heads 2A-1 and 2B-1 are contacting the magnetic disk and then separate therefrom changes as follows. That is, the upward moving amount of the upper arm 13 having the magnetic head 2A-1 is longer than that of the upper arm 13 having the magnetic 2B-1. In other words, if the smaller magnetic head 2B-1 is used, the upward moving amount of the upper arm 13 can be made smaller and thus the disk storage can be made thinner.

The conventional disk storage has a disadvantage in that, since the conventional magnetic head 2 shown in FIG. 3 includes the first and second sliders 3 and 4, the size of the magnetic head 2 becomes relatively large. As a result, the upper arm 13 must move to a higher position in order to separate the magnetic head 2 from the magnetic disk 14 and thus the disk storage cannot be made thinner.

SUMMARY OF THE INVENTION

Accordingly, it is a general object of the present invention to provide a novel and useful miniature magnetic head in which the above disadvantage is eliminated.

Another object of the present invention is to provide a miniature magnetic head which can keep a rotating angle and an upward moving amount of an upper arm relatively small.

Still another object of the present invention is to provide a miniature magnetic head so that the head carriage and the upper arm can also be miniaturized.

A further object of the present invention is to provide a miniature magnetic head which is relatively short in a radial direction of the magnetic disk.

Another object of the present invention is to provide a miniature magnetic head so that the distance between an edge of a contact surface between the magnetic head and disk and a rotating center of the upper arm can be enlarged.

The miniature magnetic head according to the present invention comprises a bulk type magnetic head core, one side surface of which is fixed on a slider and the other side surface of which is exposed.

According to the present invention, the magnetic head thereof is different from the conventional one comprising the magnetic head core each of whose sides is a slider, in that only one side of the magnetic head core of the present invention is connected to the slider, the other side thereof being exposed. Therefore, the magnetic head can be made smaller by omitting one conventional slider. In addition, the bulk type magnetic head core has enough mechanical strength to support the weight of the magnetic head.

Other objects and further features of the present invention will become apparent from the following de-

DETAILED DESCRIPTION OF THE PREFERRED EMBODIMENTS

Figures 7, 8:
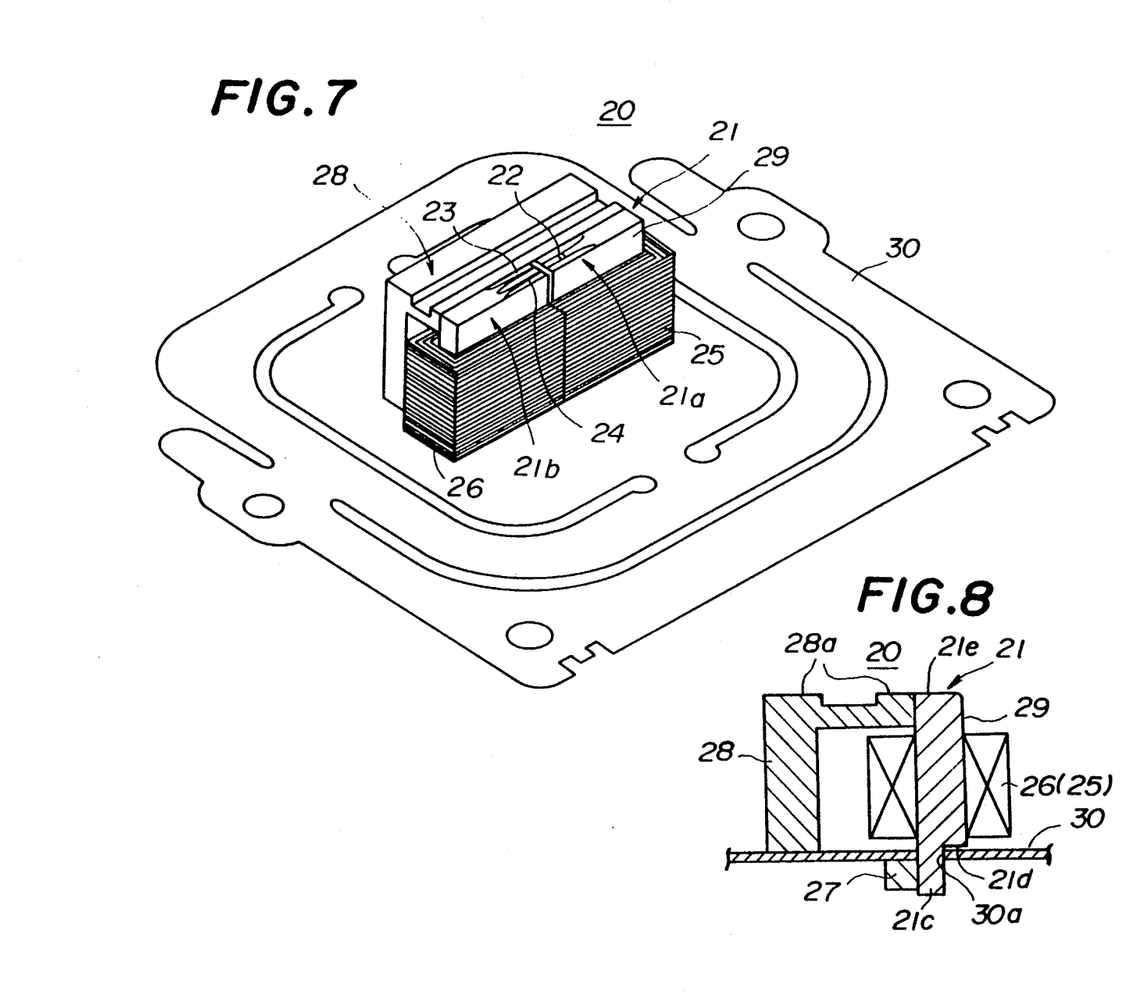
FIG. 7 shows a perspective view of a magnetic head according to the present invention.
FIG. 8 shows a longitudinal section of the magnetic head according to the present invention.

A description will now be given of an embodiment of the magnetic head according to the present invention. FIG. 7 shows a perspective view of a magnetic head 20 according to the present invention. The magnetic head 20 comprises, as shown in FIG. 7, a bulk type magnetic head core 21 made of a magnetic material, ferrite, and a gap protecting glass material. The magnetic head core part 21 a R/W head part 21a and an E head part 21b. The R/W head part 21a forms a R/W gap 22, and the E head part 21b forms E gaps 23 and 24. This magnetic head core part 21 is a bulk type magnetic head formed by junctioning a ferrite core, and has a mechanical strength larger than a laminate type magnetic head formed by a thin film technology. In the bulk type magnetic head, it is possible to make the magnetic resistance of a magnetic circuit therein small, so that the magnetic converting characteristic efficiency can be improved. The magnetic head 20 further comprises coils 25 and 26 respectively wound around the magnetic head core part 21 and a back bar 27 (shown in FIG. 8) provided under these coils 25 and 26.

One of the characteristics of the present invention is that only one side surface of the magnetic head core part 21 is engaged with a slider 28, the other side surface thereof being exposed. As a result, in contrast with the conventional magnetic head shown in FIG. 3, the present invention omits the slider 4 and thus the magnetic head 20 can be miniaturized by the width of the slider 4. In addition, the product cost thereof can be kept low.

The slider 28, made of ceramic, is bonded to one side surface of the magnetic head core part 21, and is thinner than the conventional one, which will be described later.

The magnetic head 20 is fixed on a gimbal spring 30. FIG. 8 is a cross section showing the magnetic head 20 fixed thereon.

The conventional magnetic head 2 (shown in FIG. 3) uses the first and second sliders 3 and 4 at both sides of the magnetic head core part 5 whereas the present magnetic head 20 omits the slider 4. Therefore, the magnetic head core part 21 must bear more weight to be applied to the magnetic head 20 than the conventional one. As shown in FIG. 8, the height from the gimbal spring 30 to the magnetic head core part 21 is equal to that from the gimbal spring 30 to the slider 28. A lower end part of the magnetic head core part 21 has an insertion part 21c to be inserted into a hole 30a formed in the gimbal spring 30. The lower end part has a contact part 21d which contacts the gimbal spring 30 while the insertion part 21c is being inserted into the hole 30a. The back bar 27 is provided on the insertion part 21c projected from the hole 30a. Since a contact surface 21e on the magnetic head core part 21 and a contact surface 28a on the slider 28 are located on the same plane, while the contact part 21d contacts the gimbal spring 30, the weight to be applied to the magnetic head 20 is supported by the slider 28 and the magnetic head core part 21 and the magnetic head 20 smoothly contacts the magnetic disk 14.

Figure 9:
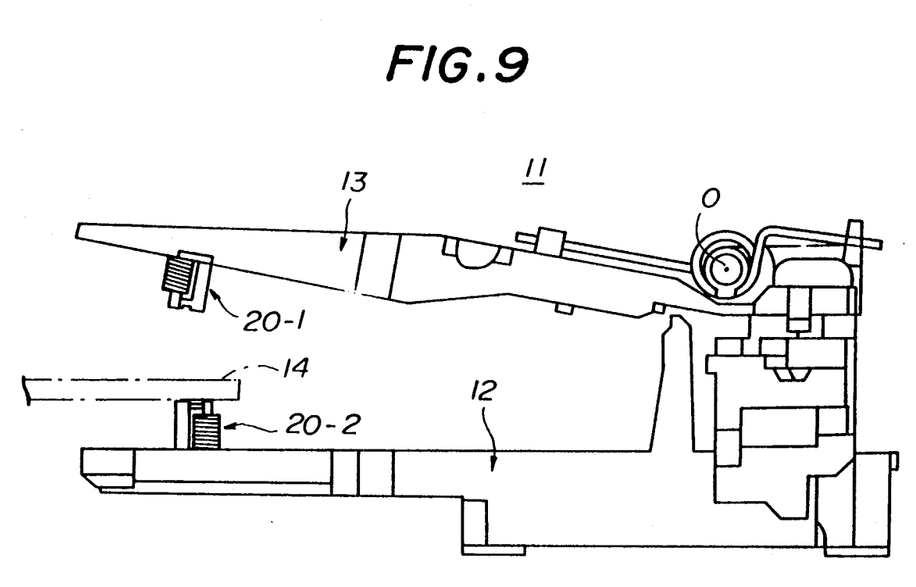
FIG. 9 shows a side view of the head carriage with the magnetic head according to the present invention.
Figure 10:
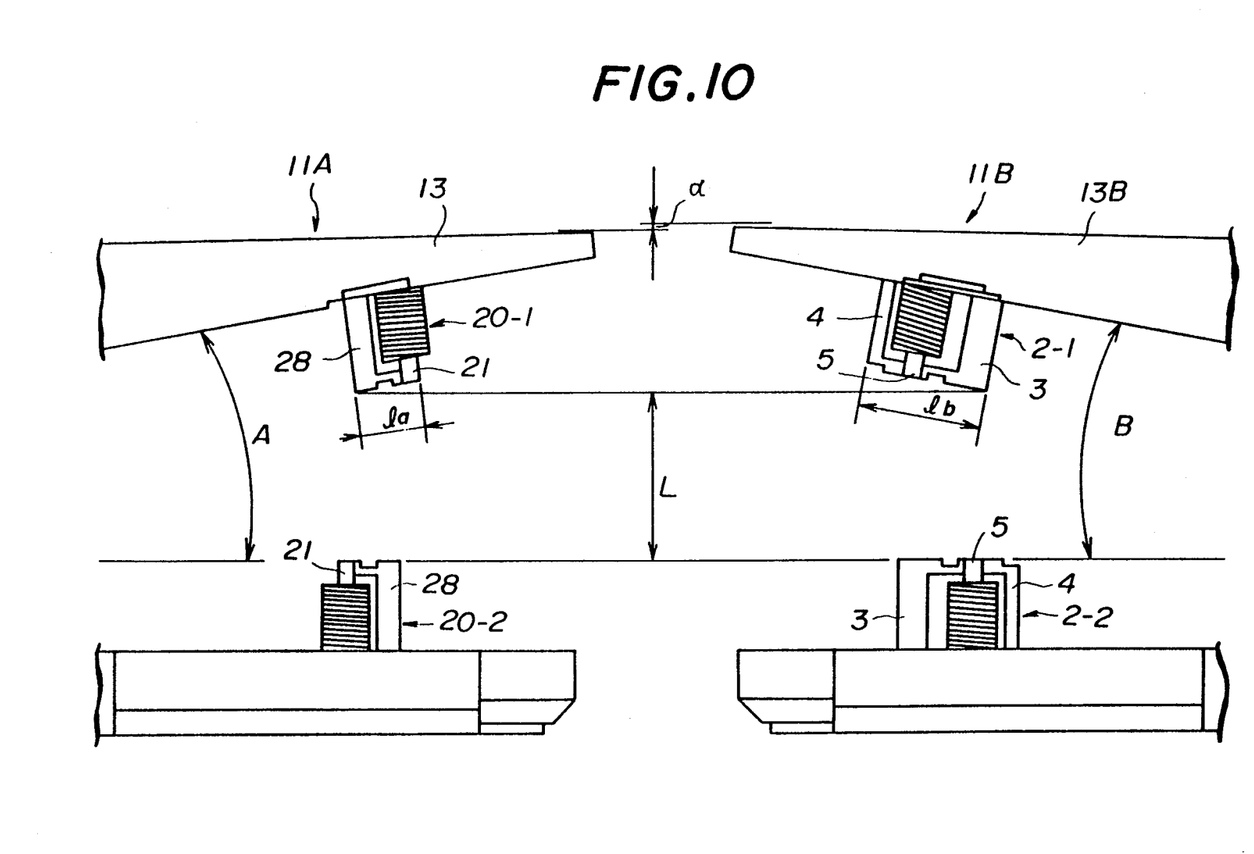
FIG. 10 shows a side view of the head carriages respectively having the conventional magnetic head and the magnetic head according to the present invention for explaining a relationship between the magnetic head and the upward moving amount of the upper arm.
Figure 11A:
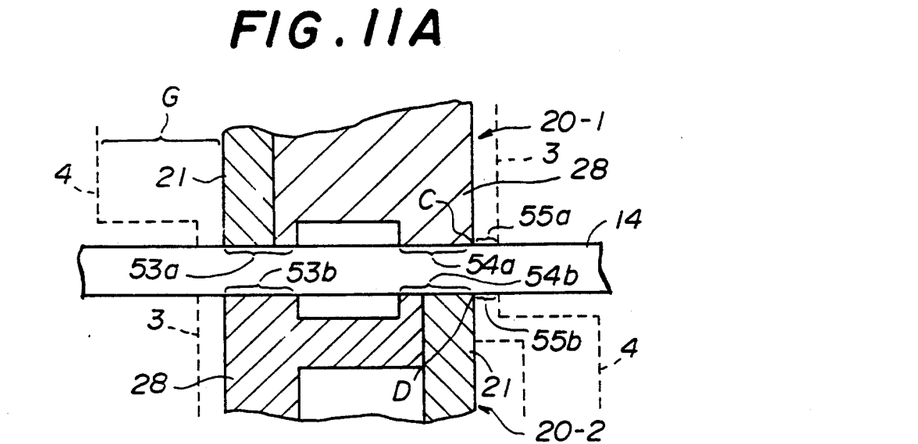
FIGS. 11A, 11B and 11C shows an enlarged longitudinal section of the magnetic head located at the contact surface between the magnetic head and the magnetic disk.

FIGS. 9 and 10 respectively show the head carriage having the magnetic head 20. Those elements in FIGS. 9 and 10 which are the same as corresponding elements in FIG. 5 are designated by the same reference numerals, and a description thereof will be omitted. As shown in FIG. 9, the magnetic head 20-2 is provided for the head carriage body 12, and the magnetic head 20-1 is provided for the upper arm 13. The upper arm 13 is moved to the magnetic disk 14 by the mechanism (not shown) while the magnetic disk 14 is engaged with the turn table 15. The magnetic head 20-1 touches the magnetic disk 14 when the upper arm 13 downwardly moves. Then the magnetic heads 20-1 and 20-2 are positioned opposite to each other with respect to the magnetic disk 14, as shown in FIG. 11A. Thus, the magnetic heads 20-1 and 20-2 respectively write down data on the magnetic disk 14 and read it therefrom. On the other hand, when the magnetic disk 14 is ejected from the disk storage, the upper arm 13 is upwardly moved and thus the magnetic head 20-1 is separated from the magnetic disk 14. Thus, the distance between the magnetic heads 20-1 and 20-2 is enlarged.

A description will now be given of the relationship between a size of the magnetic head and the upward moving amount of the upper arm 13. In FIG. 10, the magnetic heads according to the present invention are depicted in the left drawing, and the conventional magnetic heads are depicted in the right drawing. The left drawing shows a head carriage 11A having the magnetic heads 20-1 and 20-2 according to the present invention. The right drawing shows a head carriage 11B having the conventional magnetic heads 2-1 and 2-2. As is well known, when the magnetic disk 14 is to be loaded into the disk storage or ejected therefrom, both magnetic heads must be separated by a predetermined distance, as is indicated by an arrow L. As mentioned above, lengths 1a and 1b of the magnetic heads 20-1 and 20-2 in the radial direction of the magnetic disk 14 influence the upward moving amount of the upper arm 13. That is, the shorter the lengths 1a and 1b are, the smaller the upward moving amount of the upper arm 13 is.

Figure 11B:
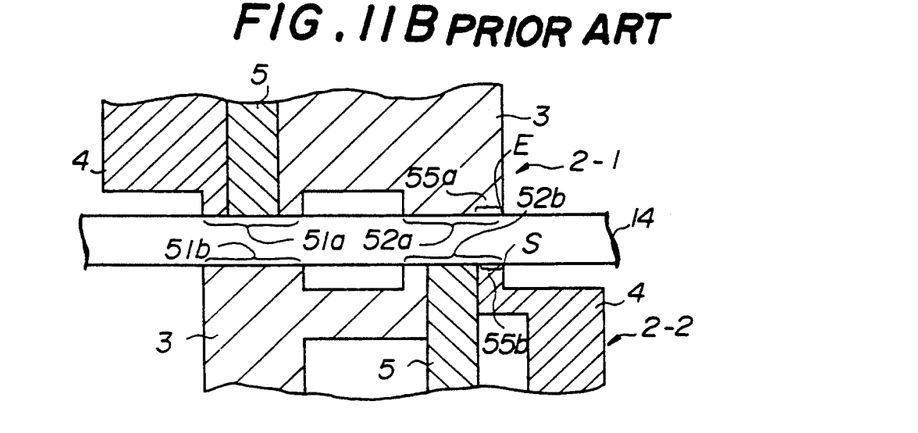
Figure 11C:
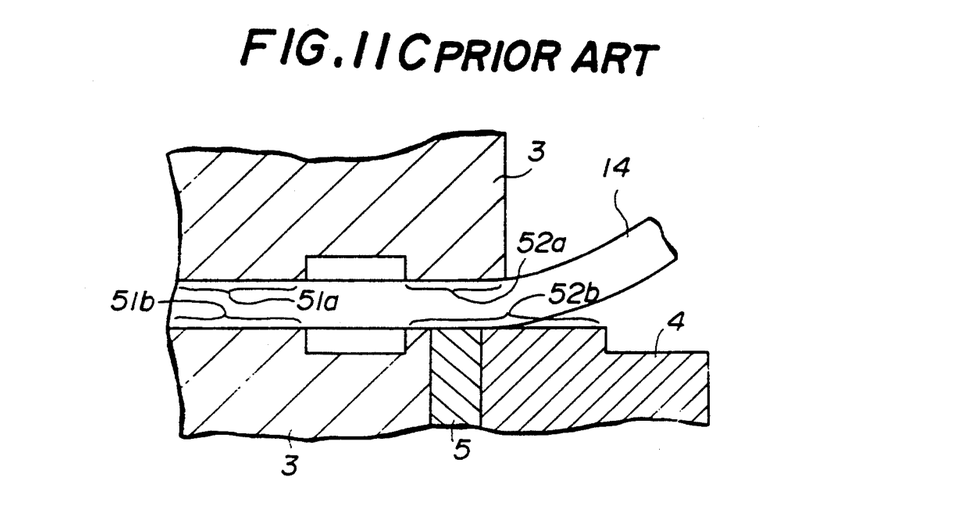

A detailed description will now be given of the above matter with reference to FIGS. 11A to 11C. FIG. 11A shows an enlarged view in the vicinity of contact surfaces 53a, 53b, 54a and 54b between the magnetic heads 20-1 and 20-2 and the magnetic disk 14. FIG. 11C shows an enlarged view in the vicinity of contact surfaces 51a, 51b, 52a and 52b between the magnetic heads 2-1 and 2-2 and the magnetic disk 14. As shown in FIGS. 11A and 11B, the respective edges of the contact surfaces 51a to 54a, and those of contact surfaces 51b to 54b are respectively located on the same planes respectively perpendicular to the contact surfaces. On the other hand, as shown in FIG. 11C, if the respective edges 52a and 52b are not respectively located on the same plane perpendicular to the contact surfaces, the magnetic disk 14 warps toward the narrow contact surface 52a and thus the surface of the magnetic disk 14 at the contact surface 52a gets damaged. To ensure proper access from the innermost track to the outermost track on the magnetic disk 14, a predetermined relationship between the magnetic disk 14 and each of the respective positions of the magnetic head cores 5 and 21 of the magnetic heads 2-1, 2-2, 20-1 and 20-2 has to be established. In addition, it is necessary to keep the distance constant between the rotating center O of the upper arm 13 (shown in FIG. 15) and the magnetic head cores 5 and 21.

Referring again to FIG. 10, the longer the distance between the rotating center O and each of edges C, D, E and F is, the smaller rotating angles A and B of the upper arm 13 to keep the distance L constant between the respective upper and lower magnetic heads core 5 and 21 become. The rotating center O is located at the right side in FIGS. 11A and 11B, and, if the distance between the rotating center O and the contact surface of the magnetic head core 5 is equal to that between the rotating center O and the contact surface of the magnetic head core 21, the distance between the rotating center O and each of the edges C, D, E and F is determined as follows. That is, when FIG. 11A showing the present invention's magnetic heads 20-1 and 20-2 is compared with FIG. 11B showing the conventional magnetic heads 2-1 and 2-2, the lengths of the contact surfaces of the magnetic disks 20-1 and 20-2 in the radial direction of the magnetic disk are shorter. Since in the present invention the slider 4 of the lower magnetic head 2-2 is omitted, the length 54b of the contact surface at magnetic disk 14 is shortened by a length 55b. Further, the length of the contact surface of the upper magnetic head 2-1 is shortened by the length 55a equal to the length 55b. Since the lengths of the contact surfaces are shortened by the lengths 55a and 55b, the distance between the rotating center O of the upper arm 13 and each of the edges of the contact surfaces becomes large, and thus the rotating angle A of the upper arm 13 becomes small. The above is also applicable to the left side. Incidentally, since the slider 4, the length G of the magnetic head 2-1 is saved. Thus, a top length and of the upper arm 13 can be shortened by the length G, and the rotating angle A thereof can be shortened, accordingly. The miniaturized upper arm 13 shortens the upward moving amount.

The length α, representing the difference between the upward moving amounts of the upper arm 13A and 13B, influences how thick the disk storage is made. That is, the disk storage according to the present invention can be made thinner than the conventional disk storage.

As shown in FIG. 8, the lower end part of the magnetic head core part 21 includes the insertion part 21c and the contact part 21d; however the insertion part 21c may be omitted. In this case, the magnetic head core part may vertically stand on the gimbal spring and the back bar may be located at the gimbal spring.

As mentioned above, according to the present invention, the magnetic head can be shortened in the radial direction of the magnetic disk 14. In addition, since the distance between the rotating center O and the edge of the contact surface can be made long, the upper arm 13 and the head carriage body 12 can be miniaturized. Moreover, the rotating angle and the upward moving amount of the upper arm 13 can be kept small. As a result, the present invention can provide a miniature magnetic head and a thin magnetic disk storage having such a head. In addition, since the number of the components is few, production costs can be kept low.

Further, the present invention is not limited these preferred embodiments, as various variations and modifications may be made without departing from the scope of the present invention.

What is claimed is:

1. A magnetic head assembly comprising a first magnetic head and a second magnetic head, each of said first and second magnetic heads comprising:

a magnetic head core having a core contact surface, said magnetic head core performing at least one of the operations of writing data on a recording medium and reading data from a recording medium by contact of said core contact surface with said recording medium, said magnetic head core having first and second side surfaces;

a slider having first and second slider side surfaces, said first slider side surface being connected to said first core side surface along a plane of bonding, said slider having a slider contact surface adapted to contact said recording medium, each of said second side surfaces of said core and said slider being exposed to air;

said slider contact surface and said core contact surface forming an overall combined contact surface for contacting said recording medium, each of said second side surfaces of said core and said slider having a linear side edge parallel to said plane of bonding and contacting said recording medium when said overall combined contact surface contacts said recording medium; and said magnetic head assembly further comprising head positioning means for positioning said first and second magnetic heads so as to make them contact said recording medium; wherein said recording medium has two surfaces and is in the form of a sheet, said positioning means positioning said first and second magnetic heads facing each other on opposite sides of said recording medium so that said linear side edge of said second side surface of said core of said first magnetic head and said linear side edge of said second side surface of said slider of said second magnetic head lie in a first plane substantially perpendicular to said surfaces of said recording medium and said linear side edge of said second side surface of said slider of said first magnetic head and said linear side edge of said second side surface of said core of said second magnetic head lie in a second plane perpendicular to said surfaces of said recording medium when said head positioning means makes each of said first and second magnetic heads contact one of said two surfaces of said recording medium, respectively.

2. The magnetic head assembly according to claim 1, wherein said head positioning means comprises gimbal springs on which said magnetic head cores and sliders of said first and second magnetic heads are respectively fixed, and said gimbal springs comprising elastic material.

3. The magnetic head assembly, according to claim 1, wherein:
said head positioning means has gimbal springs on which said magnetic head cores and slides of said first and second magnetic heads are respectively fixed, each of said gimbal springs comprising a head supporting plane; and
said magnetic head core of each of said first and second magnetic heads has a gimbal contact surface, substantially parallel to and opposite to said core contact surface, to contact a respective one of said head supporting planes of said gimbal springs, said core contact surface and said slider contact surface are included in the same plane for each of said first and second magnetic heads while said gimbal contact surface of said magnetic head core and an end surface of said slider, opposite to said slider contact surface are in contact with said respective one of said head supporting planes of said gimbal springs.

4. The magnetic head assembly according to claim 3, wherein each of said magnetic heads has only one slider.

5. The magnetic head assembly according to claim 1, wherein:
said head positioning means comprises an upper arm and a head carriage body; and
said first and second magnetic heads are respectively attached to said upper arm and head carriage body, said upper arm being supported on said head carriage body to be movable against said head carriage body in a direction substantially orthogonal to said surface of said recording medium, and a distance between said first and second magnetic heads being enlarged, when said recording medium is loaded onto or unloaded from said first and second magnetic heads, by moving said upper arm against said head carriage body.

6. A magnetic head assembly, according to claim 1, wherein:
each of said overall combined contact surfaces comprises a core-and-slider contact surface and a slider-only contact surface, both also adapted to contact said recording medium, said core-and-slider contact surface and said slider-only contact surface are located in the same plane, and said core-and-slider contact surface and said slider-only contact surface having core-and-slider side edges and slider-only side edges respectively comprising parts of edges of said core-and-slider contact surface and said slider-only contact surface, said core-and-slider side edges and said slider-only side edges being substantially parallel to said plane of bonding of said core side surface and said slider connection surface;
and each of said core-and-slider side edges and said slider-only side edges of said first magnetic head is included in a respective perpendicular plane, which plane is substantially perpendicular to the surfaces of said recording medium, in which perpendicular plane of any of said core-and-slider side edges and said slider-only side edges of said second magnetic head is included, while said head positioning means makes each of said first and second magnetic heads contact one of said two surfaces of said recording medium respectively.

7. The magnetic head assembly according to claim 6, wherein:
said core-and-slider side edges comprise a core side edge included in said core contact surface and slider side edge included in said slider contact surface; and
said core side edge of said first magnetic head is included in a perpendicular plane, which plane is substantially perpendicular to said surfaces of said recording medium, in which perpendicular plane one of said slider-only-side edges of said second magnetic head is included, and said slider side edge of said first magnetic head is included in another perpendicular plane, which plane is also substantially perpendicular to said surfaces of said recording medium, in which perpendicular plane the other of said slider-only-side edges of said second magnetic head is included; and
said core side edge of said second magnetic head is included in a perpendicular plane, which plane is substantially perpendicular to said surfaces of said recording medium, in which perpendicular plane one of said slider-only-side edges of said first magnetic head is included, and said slider side edge of said second magnetic head is included in another perpendicular plane, which plane is also substantially perpendicular to said surfaces of said recording medium, in which perpendicular plane the other of said slider-only-side edges of said first magnetic head is included.

8. The magnetic head assembly according to claim 1, wherein for each of said first and second magnetic heads, said core contact surface and said slider contact surface are located in the same plane.

9. The magnetic head assembly according to claim 1, wherein each of said magnetic heads has only one slider.

* * * * *